United States Patent

Parks et al.

[11] Patent Number: 5,325,508
[45] Date of Patent: Jun. 28, 1994

[54] PROCESSOR THAT PERFORMS MEMORY ACCESS IN PARALLEL WITH CACHE ACCESS

[75] Inventors: Terry J. Parks, Round Rock; Keith D. Matteson, Austin, both of Tex.

[73] Assignee: Dell U.S.A., L.P., Austin, Tex.

[21] Appl. No.: 58,833

[22] Filed: May 7, 1993

Related U.S. Application Data

[63] Continuation of Ser. No. 559,230, Jul. 27, 1990, abandoned.

[51] Int. Cl.5 .............................. G06F 12/00
[52] U.S. Cl. ............................ 395/425; 365/49; 364/243; 364/243.4; 364/243.41; 364/238.4; 364/281.4; 364/DIG. 1
[58] Field of Search ............ 395/425, 400, 250, 166; 365/49, 230.01

[56] References Cited

U.S. PATENT DOCUMENTS

| | | | |
|---|---|---|---|
| 3,693,165 | 9/1972 | Reiley et al. | 364/200 |
| 3,896,419 | 7/1975 | Lange et al. | 340/172.5 |
| 4,070,706 | 1/1978 | Scheuneman | 364/200 |
| 4,189,770 | 2/1980 | Gannon et al. | 364/200 |
| 4,195,342 | 3/1980 | Joyce et al. | 364/200 |
| 4,370,710 | 1/1983 | Kroft | 364/200 |
| 4,476,526 | 10/1984 | Dodd | 364/200 |
| 4,564,900 | 1/1986 | Smitt | 364/200 |
| 4,646,233 | 2/1987 | Weatherford et al. | 364/200 |
| 4,669,043 | 5/1987 | Kaplinsky | 364/200 |
| 4,747,070 | 5/1988 | Trottier et al. | 364/900 |
| 4,780,808 | 10/1988 | Moreno et al. | 364/200 |
| 4,783,736 | 11/1988 | Ziegler et al. | 364/200 |
| 4,785,398 | 11/1988 | Joyce et al. | 364/200 |
| 4,794,521 | 12/1988 | Ziegler et al. | 364/200 |
| 4,811,203 | 3/1989 | Hamstra | 364/200 |
| 4,847,758 | 7/1989 | Olson et al. | 364/200 |
| 4,897,783 | 1/1990 | Nay | 364/200 |
| 4,912,626 | 3/1990 | Fiacconi | 364/200 |
| 4,942,521 | 7/1990 | Hanawa et al. | 364/200 |
| 5,047,920 | 9/1991 | Funabashi | 395/425 |
| 5,210,845 | 5/1993 | Crawford et al. | 395/425 |
| 5,210,849 | 5/1993 | Takahashi et al. | 395/425 |

*Primary Examiner*—Gopal C. Ray
*Attorney, Agent, or Firm*—James W. Huffman; Thomas Devine

[57] ABSTRACT

A computer system includes an accessible memory controller, an accessible cache controller, and circuitry for accessing the accessible memory controller and the accessible cache controller simultaneously. Certain preferred embodiments of the present invention also include a deassertable miss line, that is, a line which when deasserted indicates that the data was found in the cache and that the memory access should be cancelled.

26 Claims, 6 Drawing Sheets

PROCESSOR THAT PERFORMS MEMORY ACCESS IN PARALLEL WITH CACHE ACCESS

This application is a continuation, of application Ser. No. 07/559,230, filed Jul. 27, 1990, now abandoned.

CROSS REFERENCE TO RELATED APPLICATIONS

This application is related to the following U.S. patent applications:

| SER. NO. | TITLE | INVENTOR | FILING DATE |
| --- | --- | --- | --- |
| 490,003 | Method and Apparatus For Performing Multi-Master Bus Pipelining | Zeller, et al. | 03/07/90 |
| 529,985 | Processor and Cache Controller Interface Lock Jumper | Holman, et al. | 05/25/90 |
| 540,983 | Error Correction Code Pipeline For Interleaved Memory | Matteson, et al. | 06/19/90 |
| 541,103 | Computer System Having A Selectable Cache Subsystem | Holman | 06/19/90 |
| 540,651 | Address Enabling System And Method For Memory Modules | Durkin, et al. | 06/19/90 |
| 532,046 | Multiple DRAM Assemblies Using A Single PCB | Holman | 05/25/90 |
| U.S. Pat. No. 5,070,450 | Power On Co-ordination System and Method For Multiple Processors | Holman, et al. | Issued 12/3/91 |
| 530,137 | Dual Path Memory Retrieval System For An Interleaved Dynamic RAM Memory Unit | Gaskins, et al. | 05/25/90 |
| 516,628 | Digital Computer Having An Error Correction Code (ECC) System With Comparator Integrated Into Re-Encoder | Longwell, et al. | 04/30/90 |
| 895,253 | Minimized Error Correction Bad Bit Decoder | Longwell, et al. | 04/30/90 |
| 516,606 | Shared Logic For Error Correction Syndrome Encoding | Longwell, et al. | 04/30/90 |
| 559,872 | Computer Data Routing System | Zeller | 7/27/90 |

BACKGROUND OF THE INVENTION

1. Field of the Invention

This invention relates to electronic digital data processing systems and, more particularly, to electronic digital data processing systems which include a cache memory as well as a main memory.

2. Description of Related Art

Improvements in data processing systems have generally been directed at the reduction of either the average time required to execute a given instruction or the cost of the equipment required to execute such an instruction. One design tradeoff which has typically been made is that of cost versus speed for units of memory for the storage of data. For example, tape memory is traditionally slower and less expensive than disk memory. Disk memory in turn is available in several types with the selection of any one type over another involving a cost/speed tradeoff. Disk memory is slower but less expensive than solid-state memory which itself is available in several types, the selection of which again involves a cost/speed tradeoff. Thus, it continues to be a need of the art to provide cheaper, faster memories or, failing that, to improve the efficiency of presently existing memory types. The present invention relates to an improvement of the second type. In particular, the invention involves apparatus and methods of operation for reducing the average time necessary for a host central processing unit (CPU) having an associated cache memory and a main memory to obtain stored data from either memory.

By way of background, it should be appreciated that computer systems are generally provided with more than one type of memory. Recognizing that the cost of a single fast memory would be prohibitive, computer designers have henceforth employed a variety of devices to hold data and instructions, the repository for each piece of information being selected based upon how urgently the information might be needed by the CPU. That is, in general, fast but expensive memories are used to store information the CPU might need immediately, and slower but less expensive devices are used to retain information for future use.

A multitude of memory and storage devices have heretofore been used in computer systems. Long-term storage is generally effected using disk and tape storage. Disk and tape implemented data storage are presently the slowest of all of the memory and storage devices in common use, and they are generally used to hold data and programs that are not in actual use by the processor. Moving information stored on disks and tape into the main memory requires a relatively long period of time, but this slowness is tolerable since the movement of data and instructions from disk and tape storage are infrequent and can be done without the full attention of the CPU.

Another memory device is a read-only memory or ROM. A ROM, with typical access times between 50 and 200 nanoseconds, retains its contents when the computer is turned off. The ROM memory typically holds start-up programs that prepare the machine for use.

Another memory device, most commonly used for a system main memory, is the RAM memory which is employed for storage of data and program instructions brought from disk or tape for immediate use by the CPU. The main memory usually comprises a number of dynamic RAM ("DRAM") chips. The processor can retrieve the contents of these DRAMs in about 100 nanoseconds, placing this type of memory alongside ROM in speed.

Yet another type of memory device is cache memory. Cache memory usually comprises a number of static RAM ("SRAM") chips. Cache memory is up to ten times faster than main memory and is designed to hold the operating instructions and data most likely to be needed next by the CPU, thereby speeding computer operation.

Finally, small amounts of memory within the CPU are called CPU memory or registers. Made of static RAM circuits optimized for speed, data registers within the processors are the fastest memory of all. A program register stores the location in memory of the next program instruction while an instruction register holds the instruction being executed and a general purpose register briefly stores data during processing.

Based upon the foregoing, it should be appreciated that it is known to those skilled in the art to include a cache memory configuration in a computer system to provide a place for fast local storage of frequently accessed data. A cache system intercepts each one of the microprocessor memory references to see if the address of the required data resides in the cache. If the data does reside in the cache (a "hit"), it is immediately returned to the microprocessor without the incurring wait states necessary to access main system memory. If the data does not reside in the cache (a "miss"), the memory address reference is forwarded to the main memory controller and the data is retrieved from main memory. Since cache hits are serviced locally, a processor operating out of its local cache memory has a much lower "bus utilization", which reduces system bus bandwidth requirements, making more bus bandwidth available to other bus masters. This is significant because, as is well known to those skilled in the art, the bus in the computer; that is, the communications channel between the CPU and the system's memory and storage devices is a principal bottleneck. Virtually all instructions and all data to be processed must travel this route at least once. To maximize system performance, it is essential that the bus be used efficiently.

As should be fully appreciated by those skilled in the art, the addition of a cache controller into a computer system is structured so as to separate the microprocessor bus into two distinct buses: the actual microprocessor bus and the cache controller local bus. The cache controller local bus is designed to look like the front end of a microprocessor by providing a cache controller local bus equivalent to all appropriate microprocessor signals. The system interconnects to this "micro-processor like" front end just as it would to an actual microprocessor. The microprocessor simply sees a fast system bus, and the system sees a microprocessor front end with a low bus bandwidth requirement. The cache subsystem is transparent to both. Transparency, in the data communications field, refers to the capability of a communications medium to pass, within specified limits, a range of signals having one or more defined properties. It should be noted that in such systems the cache controller local bus is not simply a buffered version of the microprocessor bus, but rather, is distinct from, and able to operate in parallel with, the microprocessor bus. Thus, other bus masters, that is, supervisory systems of one kind or another residing on either the cache controller local bus or the system bus, are free to manage the other system resources while the microprocessor operates out of its cache.

As previously stated, a cache memory system intercepts memory references and forwards them to system memory only if they "miss" in the cache. Many prior art U.S. patents are directed to various aspects of cache memories and methods of accessing memories which include a cache memory section including: U.S. Pat. No. 4,794,521 to Ziegler et al., U.S. Pat. No. 4,646,233 to Weatherford et al., U.S. Pat. No. 4,780,808 to Moreno et al., U.S. Pat. No. 4,783,736 to Ziegler et al., U.S. Pat. No. 4,195,342 to Joyce et al., U.S. Pat. No. 4,370,710 to Kroft, U.S. Pat. No. 4,476,526 to Dodd, U.S. Pat. No. 4,070,706 to Scheuneman, U.S. Pat. No. 4,669,043 to Kaplinsky, U.S. Pat. No. 4,811,203 to Hamstra, U.S. Pat. No. 4,785,398 to Joyce et al., U.S. Pat. No. 4,189,770 to Gannon et al., and U.S. Pat. No. 3,896,419 to Lange et al. The latter patent, U.S. Pat. No. 3,896,419 to Lange et al., entitled "Cache Memory Store in a Processor of a Data Processing System" discusses the "parallel" operation of a cache store and other requests for data information from the main memory. The patent specifically teaches, however, checking the cache store while signals are "readied" for the backup memory store. Further, Lange et al. specifically teach making the cache directory, the cache store, and the control logic therefor part of the central processor. With this type of structure, cache checking is completed before the regular main memory cycle is started, so that if a "hit" is made in the cache, the main memory cycle never leaves the processor. This type of system is wholly different from systems in which a main memory access signal is actually sent out on a bus "in parallel" with a cache memory access signal.

Based upon the foregoing, it should be appreciated that in computer systems heretofore constructed which include a cache, when a memory reference occurs the access is "looked up" in the cache, and only if the reference is not found (or "misses") in the cache is it turned into a signal sent out on a bus to system memory. This causes at least two problems. First, cache misses incur a cache look-up latency, and so take at least an extra clock period to go through an access cycle over a system without a cache. Moreover, it should be noted that with a poor hit rate a system with a cache could run slower than a system without a cache. Second, cache controller complexity and pin requirements are increased because the cache controller has to recreate a processor bus for the memory controller. Such complexity causes slower operation since bus re-creation also adds latency to the memory access on cache misses.

SUMMARY OF THE INVENTION

The present invention provides a computer system having a cache controller and a memory controller in which both the cache controller and memory controller are accessed in parallel. That is, data is looked up in the cache and main memory simultaneously. If the desired data is not found in the cache, the search for it continues in the main memory a few clocks ahead of where it would have been if the search had not begun until the cache miss was recognized. In such an event, the search in the main memory was not delayed because of the cache search. If the data is found in the cache, the beginning of the search in the main memory is cancelled since to continue it would result in redundant information being accessed.

Because in the present invention it is not necessary to recreate the bus to the memory controller, a number of pins on conventional cache controllers are superfluous and can be removed.

Stated another way, the present invention provides a computer system having a main memory and a cache memory, which includes means for looking up data that could be stored in the cache memory and means for looking up data that is stored in the main memory, and means for actuating both of those means simultaneously.

In certain embodiments of the present invention, the means for looking up data that is stored in the main memory may be disabled. In certain preferred embodiments of the present invention the overall system also includes means for disabling the means for looking up data that is stored in the main memory when the means for looking up data that could be stored in the cache memory locates such data. In another aspect, certain preferred embodiments of the present invention include a miss line which can be deasserted to indicate that an access, i.e., data, was found in the cache and that, therefore, the main memory access should be cancelled.

Accordingly, it is an object of the present invention to provide a computer system in which access to the main memory is not delayed by the presence and/or use of a cache.

Another object of the present invention is to provide a computer system in which data is accessed from memory systems as quickly as possible.

Yet another object of the present invention is to provide an improved method for extracting data from memories, which method can be incorporated into certain computer systems.

Still another object of the present invention is to provide a streamlined cache controller, the streamlining being made possible because the conventional requirement that pins be present on the cache controller to recreate a processing bus for the memory controller is obviated.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE INVENTION

Figure 1:
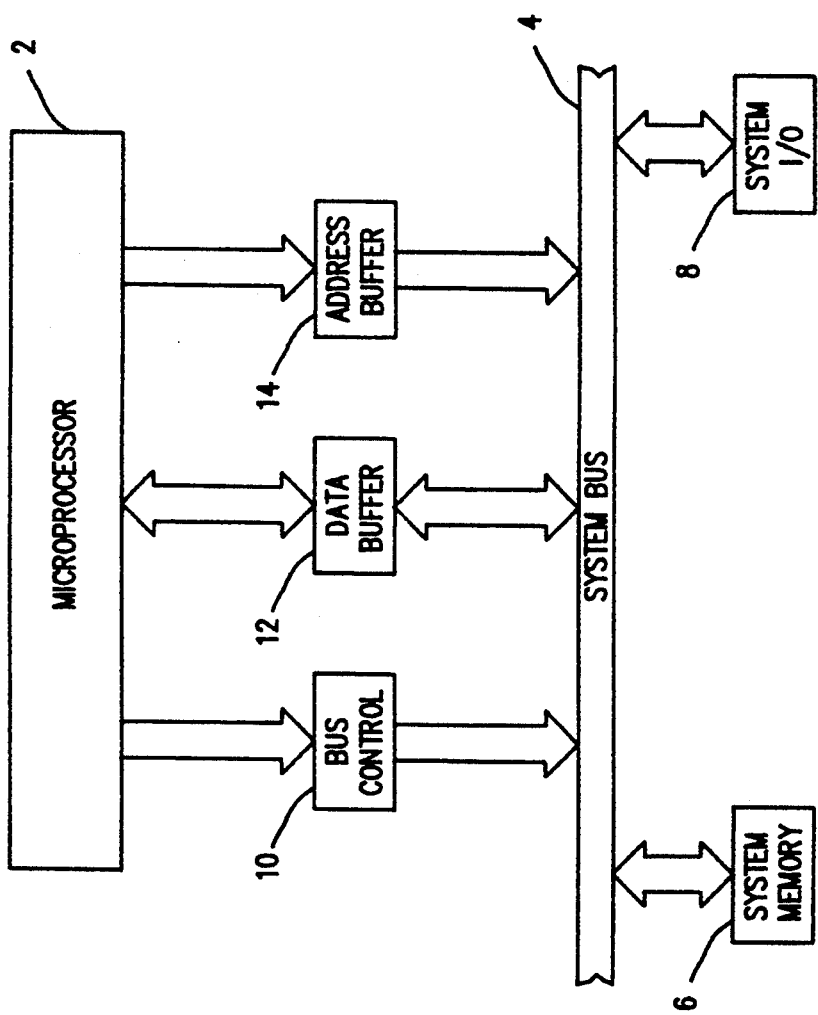
FIG. 1 is a block diagram of a prior art microprocessor system bus structure.
Figure 2:
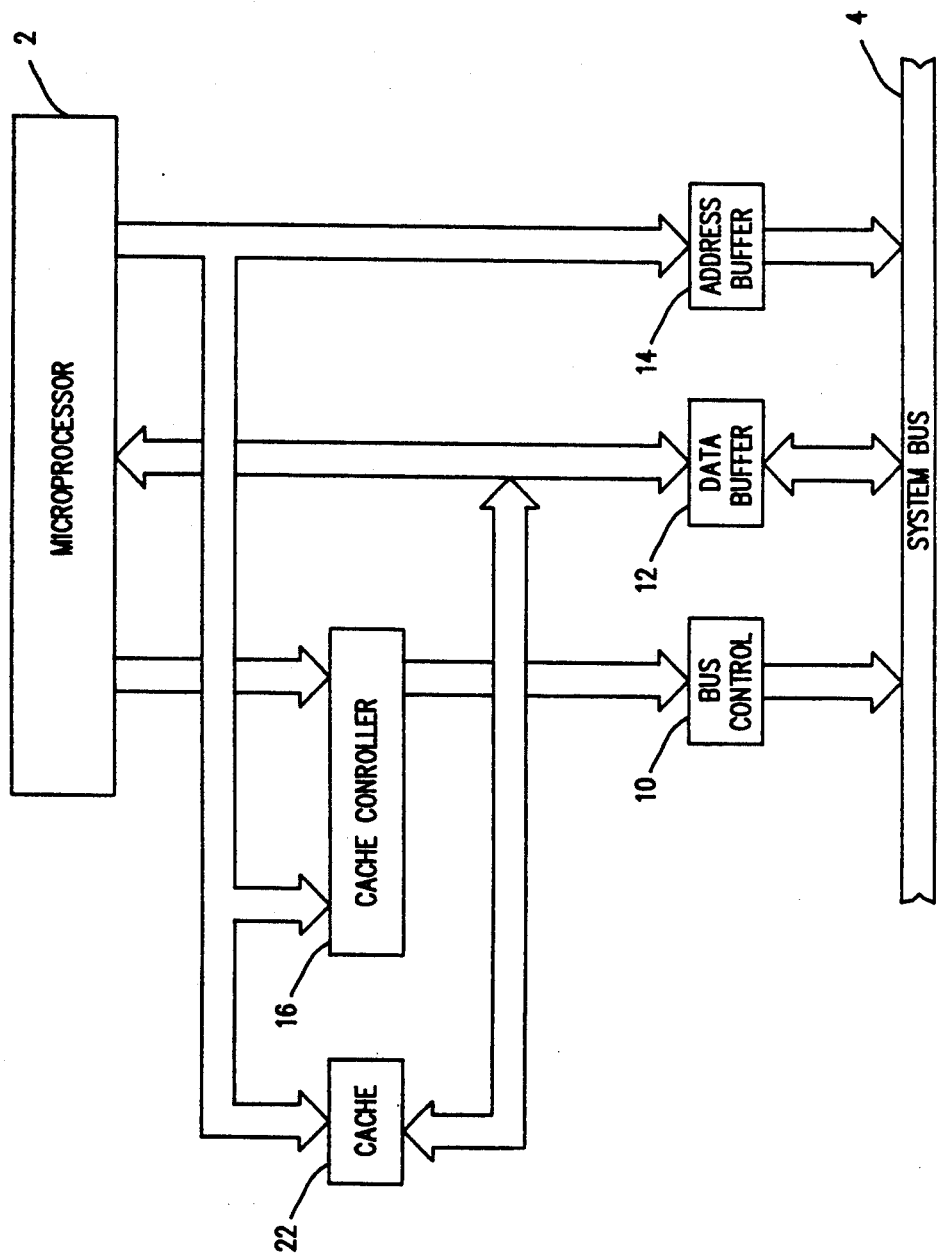
FIG. 2 is a block diagram of a prior art microprocessor and cache controller system bus structure.

Referring now to the drawings wherein like or similar elements are designated by identical reference numerals throughout the several views, shown in FIGS. 1 and 2 are block diagrams of certain prior art bus structures that should be understood because they form a substantial part of the general environment of the present invention. The structure shown in these FIGURES was discussed in the description of related art section above; however, to facilitate understanding, further details are set forth below.

As previously stated, in the electronic computer arts, particularly as applied to personal computers, the term "bus" refers to one or more conductors used for transmitting signals or power from one or more sources to one or more destinations. Bus lines can also be grouped together because of similarity of function, which similarity of function can arise in a connection between two or more systems or subsystems.

Computer systems are frequently considered to comprise a number of subsystems such as CPU, memory and I/O, all of which are interconnected by the system bus. The subsystems generally consist of one or more integrated circuits (IC's) and may be viewed as a collection of registers, or simply, devices capable of retaining information arranged in the form of binary zeros and ones. Registers in general may be considered to be "operational" if they transform data in some way or "storage" if they simply store data. The overall computer system operation, then, can be viewed as one of transferring data, including data that represents instructions, between various registers in the system and transforming data in operational registers.

In view of the foregoing, the system bus is divided into an address bus, a data bus, and a control bus. The address bus is used by the microprocessor to specify a particular memory or I/O register that will be involved in a data transfer with the data actually being transferred on the data bus. The signals that control and synchronize the operation of the subsystems sending and receiving signals along the address and data bases are provided over the control bus.

Referring now specifically to FIG. 1, the bus structure of a typical prior art processor subsystem is depicted therein in which reference number 2 designates a microprocessor and reference numeral 4 designates a system bus. The microprocessor 2 is connected to system memory 6 and system input and output devices 8 via the system bus 4. Control, data and address signals, discussed above, are routed through a bus control 10, a data buffer 12, and an address buffer 14, respectively, between the microprocessor 2 and the system bus 4.

Data buffer 12 and address buffer 14 serve to buffer and/or latch the local data and address busses, which include those conductors between the microprocessor 2 and data buffer 12 and address buffer 14, to make them the "system" address and data buffers. Similarly, the local control bus (that is, the conductors between microprocessor 2 and bus control 10) is decoded by bus control logic in bus control 10 to generate the various system bus read and write commands.

Referring now to FIG. 2, the system of FIG. 1 is shown as it would be conventionally modified by the inclusion of a cache controller 16 therein, such as an Intel 82385 cache controller. It should be appreciated with reference to FIG. 2 that the addition of the cache controller 16 causes a separation of the microprocessor bus, as defined above, into two distinct buses. The first is the actual microprocessor local bus which extends between the microprocessor 2 and the data buffer 12 and address buffer 14. The second bus is a "cache controller local bus" which extends between data buffer 12 and address buffer 14, on the one hand, and system bus 4 on the other hand. The cache controller local bus is intended to look like the front end of a microprocessor by providing cache controller local bus equivalents to all appropriate microprocessor signals. The computer system, of course, ties or connects to this microprocessor-like front end just as it would to an actual microprocessor. The system sees, for all practical purposes, a microprocessor front end with its low bus bandwidth requirements. The microprocessor, on the other hand, simply sees a fast system bus. The cache subsystem is, as previously indicated, transparent to both.

Continuing to refer to FIG. 2, it should be appreciated that the control and address signals from the microprocessor 2 are both routed through the cache controller 16. Address signals are further routed into cache 22 associated with cache controller 16 as directed by cache controller 16. It should be further appreciated that data flow between the cache controller 16 and the system bus 4, and, hence, other elements, is a two-way interchange.

Figure 3:
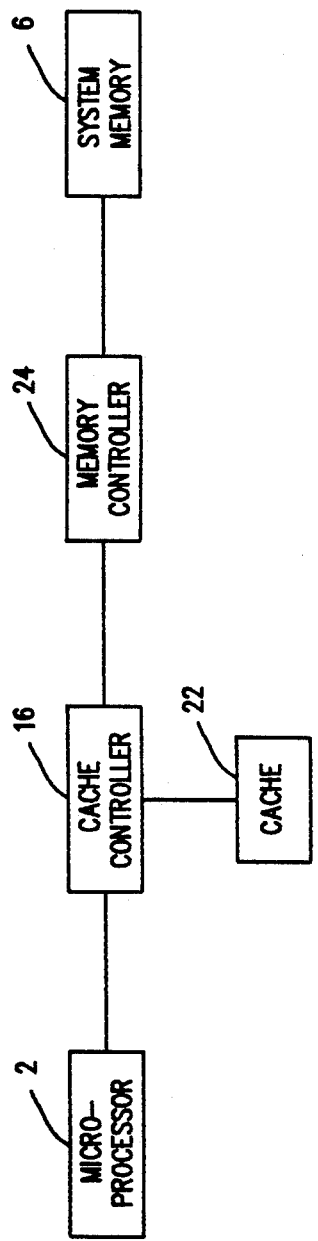
FIG. 3 is a block diagram of a prior art microprocessor and cache controller system.

Referring now to FIG. 3, yet another block diagram of a prior art processor system configuration is depicted therein. As indicated in the description of related art section above, the cache memory system "intercepts" microprocessor memory references to see if the required data resides in the cache. If the data does reside in the cache 22 (a "hit"), the data is returned to the microprocessor without incurring any wait states. If, on the other hand, the data is not found in the cache (a "miss"), the memory reference is forwarded to the system and the data retrieved from main memory. In the context of FIG. 3, this series of actions is represented by the microprocessor 2, a cache controller 16, a memory controller 24, and a system memory 6 connected in series. Cache 22 is connected to cache controller 16. When connected in the functional series configuration illustrated, memory references are initially made to the cache controller 16 only. Thereafter, only if there is a miss in the cache 22 is the memory reference referred to the main, or system, memory The term latency in the electronic computation arts is used to refer to the time between completion of an address and the start of an actual transfer of data from the addressed location. With special reference to the subject matter discussed herein, latency can also include the cache lookup time prior to a miss. With that understanding, it should be clear that in prior art systems cache misses ensure a cache lookup latency. This means that systems with such a cache configuration will require at least one clock cycle more time to pull references from main memory than similar systems without a cache. It should also be appreciated that no recreation of any function is without associated costs. Thus, to the extent that prior art systems are required to "recreate" the memory controller, latency is also added to memory accesses on cache misses.

Figure 4:
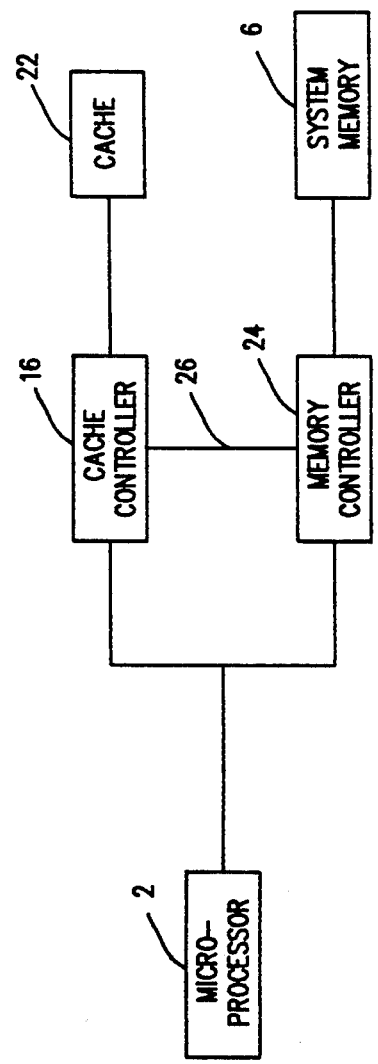
FIG. 4 is a block diagram of a microprocessor and cache controller system according to the present invention.

Referring now to FIG. 4, there is shown a block diagram of a system constructed in accordance with the present invention. In this system the cache controller 16 and memory controller 24 are accessed in parallel by microprocessor 2. Thus, the processes of searching for data and retrieving it if found are initiated in both the cache memory 22 and main memory 6 simultaneously. If the data is not found in the cache 22 then it can be retrieved from the main memory 6 with no delay associated with cache lookup latency. If, on the other hand, the data is found in the cache 22, the data need not be retrieved from main memory 6 and the access to memory controller 24 can be cancelled by, e.g., transmission of a signal from the cache controller 16 to the memory controller 24 via line 26. This line 26 is either an asserted "hit" line or a deasserted "miss" line, either of which would communicate the need to terminate the main memory access cycle because the data was found in the cache 22.

Figure 5:
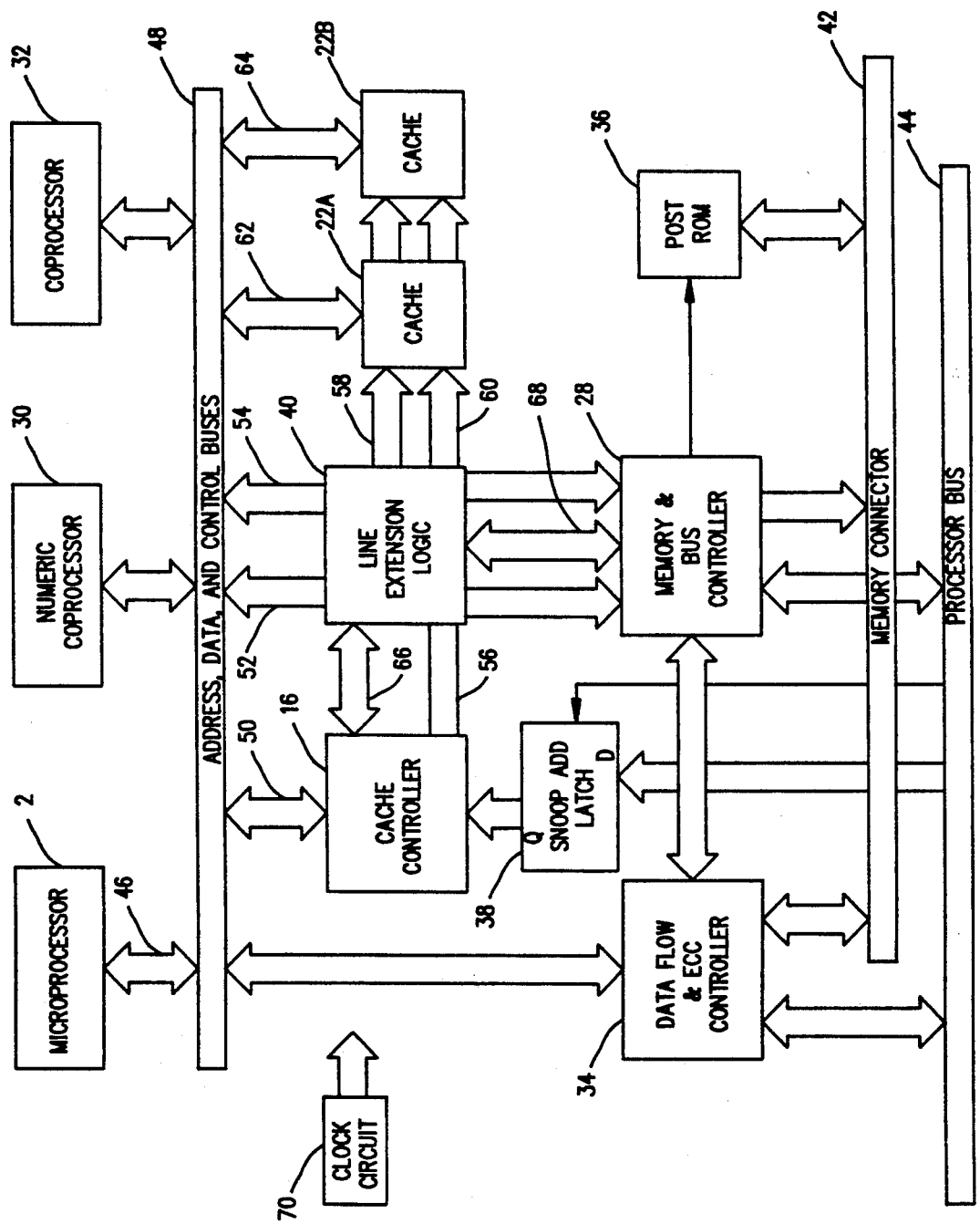
FIG. 5 is a block diagram of a portion of a processor system including a preferred embodiment of the present invention.

Referring now to FIG. 5, shown therein is a block diagram of a computer system processor module that should be helpful to those skilled in the art to understand and appreciate how the system and method of the present invention may be implemented. FIG. 5 illustrates the major components of a generic processor card which include a microprocessor 2, a cache controller 16, a cache memory 22A, 22B (designated in two parts because it is shown as comprising two banks of SRAMs), and a memory and bus controller 28. The processor module FIG. 5 may also include a numeric coprocessor 30 such as an Intel Model 80387, an optional coprocessor 32 such as a Weitek 3167 or 4167, a data flow and error correction code (ECC) controller 34, a power up, self test read only memory (POST ROM) 36 associated with the memory and bus controller 28, a conventional snoop address latch 38, and a programmable array logic (PAL) line extension logic 40. As shown in FIG. 5, the overall processor module interfaces to the rest of the system through a memory connector 42 and a processor bus 44.

The memory connector 42 interconnects the processor module to the various memory elements included in the overall computer system. The processor bus 44, on the other hand, serves as a connection between the processors, intelligent I/O, all system memory, and the system I/O and I/O expansion slots.

The processor module of FIG. 5 includes local address, data and control buses that interconnect the microprocessor 2, coprocessors 30, 32, and cache memory 22, as well as the data flow and ECC controller 34 and the memory and bus controller 28. This interface is used for local cycles such as ROM reads, coprocessor cycles and cache read hits.

The cache subsystem of the processor module comprises cache 22A, 22B, cache controller 16, line extension logic 40 and snoop address latch 38. The purpose of the snoop address latch is to capture each system bus address cycle that is generated to invalidate cache entries where necessary. The purpose of the line extension logic 40 is to follow the address and control signals to cache 22A, 22B.

In the embodiment of the present invention shown in FIG. 5 local address and control signals are transmitted from the microprocessor 22 to the cache controller 16 via the microprocessor local bus 46, address and control conductors in buses 48, and the local address and control bus 50. Simultaneously, those same signals are used for main memory access, and are transmitted to memory and bus controller 28 over buses 46 and 48, as discussed above, as well as over control bus 52 and address bus 54. Address and control signals are transmitted from cache controller 16 to cache 22A, 22B via buses 56, 58, and 60. Hits in the cache 22A, 22B result in data being sent locally via local data buses 62, 64 and buses 48 and 46 to processor 2. When there is a cache hit, the search in main memory is immediately terminated via a control signal generated and passed through control bus 66, control bus 68, and line extension logic 40. In the event of a miss in the cache, on the other hand, search and retrieval of data from main memory will continue uninterrupted. Thus, retrieval of data from main memory, if necessary, can proceed without any cache lookup latency whatsoever.

Further, with respect to the cache lookup latency, although it should be well understood by those skilled in the art, a clock circuit 70, which forms a part of all convention computer systems, would be the source of such latency. Typically, the clock circuit 70 includes a quartz crystal clock which sends signals through the computer system at the rate of several MHz. Every action within the computer is regulated precisely by this clock signal. On each single clock cycle, all registers (i.e., temporary storage circuits) within the computer can be reset or an address can be loaded into a program counter. In prior art systems, latency is introduced when each clock cycle is not used to retrieve data from main memory, when such retrieval is ultimately necessary. Loss of seven or eight clock cycles is not uncommon.

Figure 6:
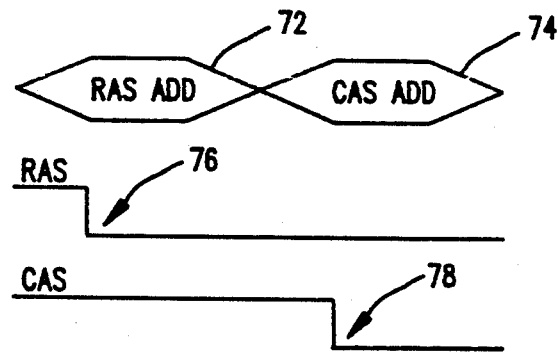
FIG. 6 is a diagram showing aspects of the timing of the system and method of the present invention.

Further details regarding the present invention, and especially the timing of various operations performed as a part thereof, may be understood and appreciated by considering FIG. 6. As previously stated, data found in the cache memory is basically instantly available, whereas 7 or 8 clocks are required to obtain data stored only in the main memory. In any event, generally two clocks are required to generate a memory access signal. Such a signal comprises a Row Address Strobe (RAS) signal 72 that is generated and held for about a clock and a Column Address Strobe (CAS) signal 74 that is then generated and held for about a clock. Together, as should be appreciated by those skilled in the art, the RAS and CAS signals cause the memory to latch a physical address suitable for application to a memory or storage unit. Either a RAS control pulse or a CAS control pulse can be "asserted" (as indicated as points 76 and 78, respectively, in FIG. 6) to effect an access cycle. Asserting RAS or CAS control pulses and not effecting a cycle would, of course, be undesirable because it could possibly cause an error in the memory and because time would be lost in bringing the cycle back up. In the system of the present invention, both RAS and CAS signals are set up, which requires approximately 2 clock cycles, and approximately another clock cycle is consumed in mapping, creating a window of approximately 3 clock cycles. During this window, a determination is made whether there is a "hit" in the cache. If there is a "hit", a decision is made simply not to drop the CAS control pulse. Not asserting the CAS control pulse causes no problems in either memory operation or timing of subsequent operations. If, on the other hand, there is a "miss" in the cache memory, the control pulse CAS is dropped. In such an event, because of the operation of the present invention, a 2 to 3 clock head start for main memory accesses is obtained.

Figure 7:
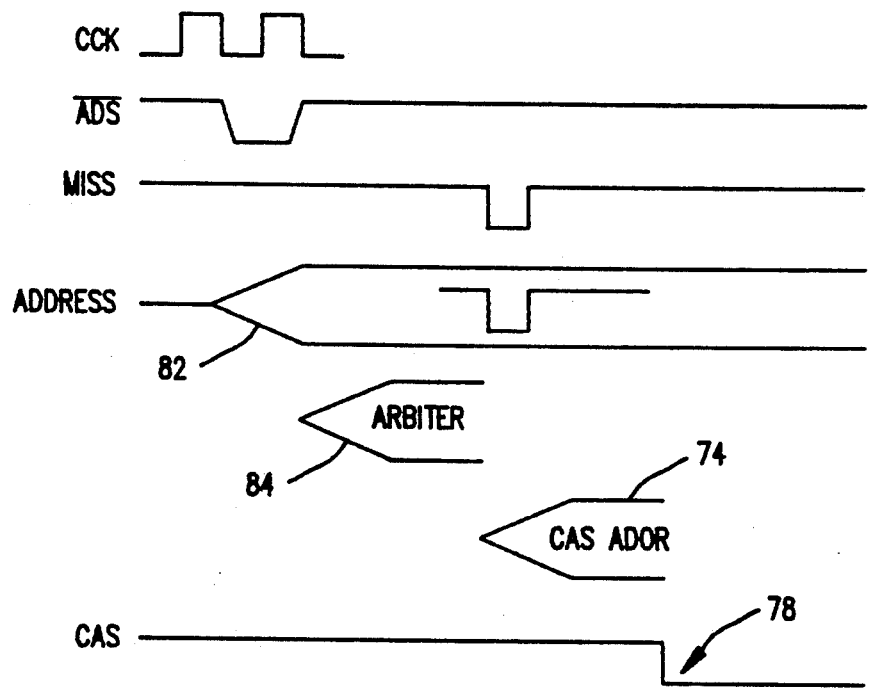
FIG. 7 is another diagram showing aspects of the timing of the system and method of the present invention.

Referring now to FIG. 7, further details regarding the timing aspects discussed immediately below are set forth. It should now be appreciated that the clock 70 (shown in FIG. 5) generates clock pulses which drive the entire timing system. When a cycle is to be started, the processor 2 sends out an address strobe ADS~82. Virtually instantaneously, the address 82 is loaded into an arbiter 84 in preparation to be sent onto the system bus. At this point, the RAS and the CAS signals are set up, as previously mentioned, and a determination is made whether to assert the CAS control pulse depending upon whether there is a "hit" in the cache. A signal indicating a "miss" results in a decision to complete the cycle and assert the CAS control pulse 78.

Figure 8:
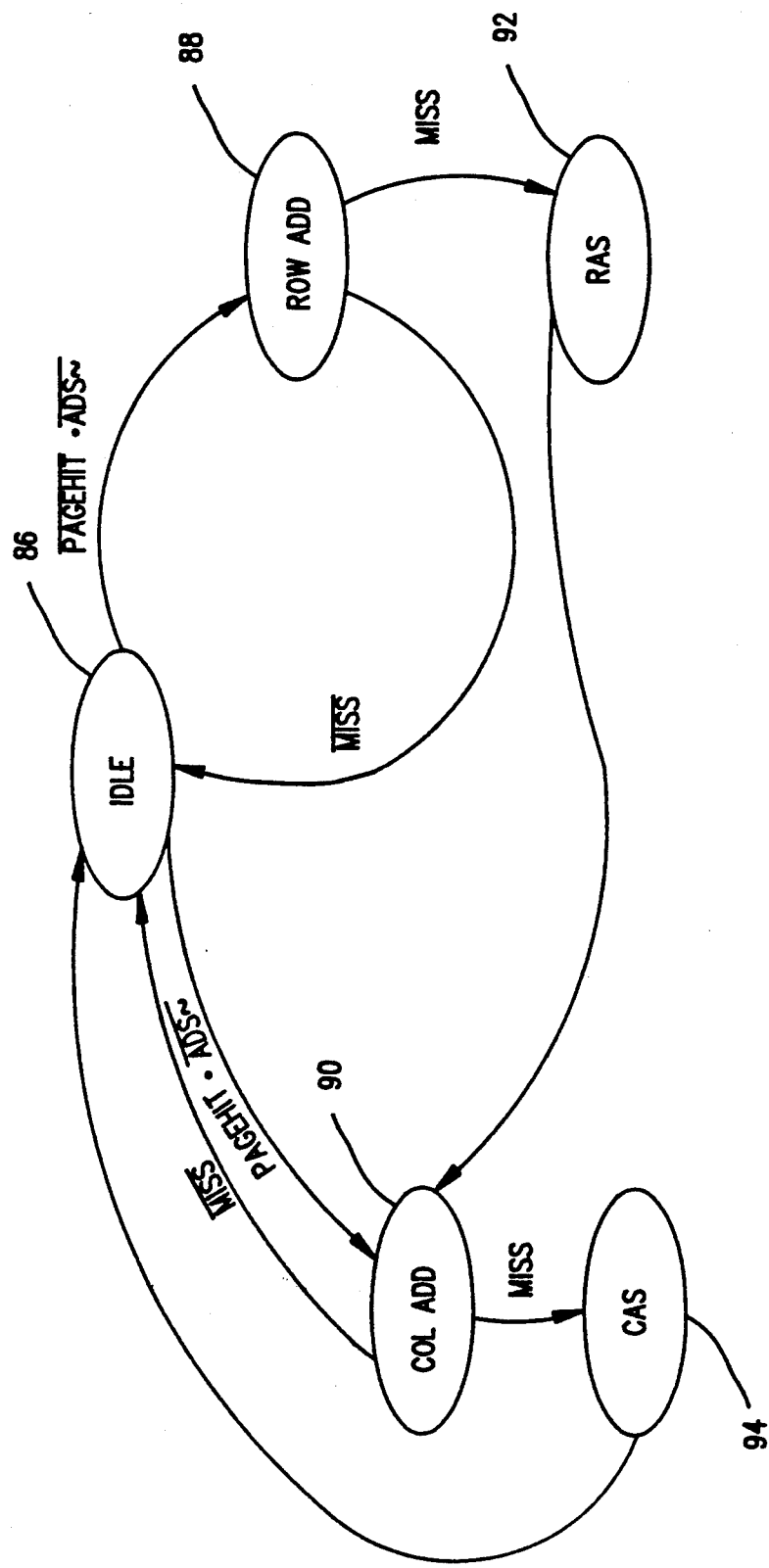
FIG. 8 is a state diagram showing the internal states of the system of the present invention, and state transitions therein.

The state machine, shown as a state diagram in FIG. 8, is physically located in memory and bus controller 28 shown in FIG. 5.

When a memory cycle is to begin, signal ADS~ and the signal PAGEHIT cause the state machine to move from the idle state 86 to the ROWADD state 88. Cache controller 16 determines whether the address indicates a cache hit or miss. Consequently the signal MISS (a hit) returns the state machine to the idle 86 state. If there is a MISS, then the state machine moves to RAS 92 to reference the main memory. The signal PAGEHIT is true if ROWADD is the same as that of the previous cycle.

If the system is in the idle state 86, and if there is a PAGEHIT when ADS~ signal is present, then the state machine moves to COLADD 90 to assert the column address to the main memory. Again, cache controller 16 determines whether the address indicates a hit or miss. If there is a hit, then the signal MISS returns the state machine to the idle state 86.

Another entry to the column address 90 state is from RAS state 92 to complete the addressing of main memory. From COLADD 90, a MISS indicates that main memory must be addressed and the signal MISS places the state machine in the CAS 94 state to complete the main memory addressing. After the assertion of the CAS signal at CAS 94, the state machine returns to the idle state 86 and the memory cycle is completed.

The state machine of FIG. 8 thus graphically illustrates how the main memory reference is aborted if the information sought is present in the cache memory.

By comparing FIGS. 5 and 4, showing the systems of the present invention, to FIGS. 3 and 2, illustrating the prior art, it should be appreciated that in a system constructed according to the present invention a number of pins on cache controller 16 which recreate the microprocessor local bus structure, are rendered superfluous. Since the system of the present invention is simpler to construct than prior art cache controllers it is thus less expensive to manufacture.

Obviously, numerous modifications and variations are possible in view of the above teachings. Accordingly, within the scope of the appended claims, the invention may be practiced otherwise than as specifically described herein.

What is claimed is:

1. A computer system having a central processing unit (CPU) for processing data a main memory electrically connected to the CPU for storing the data and for providing the data to the CPU upon request, and a cache memory electrically connected to the CPU for storing the data and for providing the data to the CPU upon request; said system comprising:

means, electrically connected to said CPU and to said cache memory, for allowing said CPU to access data which is stored in said cache memory; means, electrically connected to said CPU and to said main memory, for allowing said CPU to access data which is stored in said main memory concurrently and in parallel with said cache memory means allowing said CPU to access data which is stored in said cache memory; and means, electrically connected to said cache memory means and to said main memory means for determining whether data requested by said CPU is stored in said cache memory, and if said requested data is stored in said cache memory, disabling said main memory means accessing said requested data which is stored in main memory;

wherein said main memory means continue to access said requested data from said main memory if said requested data is not stored in said cache memory; and wherein no delay in accessing said main memory is created by said concurrent and parallel access by said cache memory means.

2. A system as recited in claim 1, wherein said means for accessing data that is stored in said main memory comprises a memory controller.

3. A system as recited in claim 2, wherein said means for accessing data that may be stored in said cache memory comprises a cache controller.

4. The computer system of claim 1 wherein said cache memory is accessed by a row address strobe (RAS) signal followed by a column address strobe (CAS) signal.

5. The computer system of claim 4 wherein said main memory is access by said RAS signal followed by said CAS signal.

6. The computer system of claim 5 wherein said main memory is accessed by said RAS signal concurrently with said cache memory being accessed by said RAS signal.

7. The computer system of claim 1 wherein said cache memory means does not duplicate a processor bus interface between the CPU and the main memory means.

8. A computer system for accessing a main memory and a cache memory in parallel, without cache lookup latency, the computer system comprising:

a central processing unit (CPU) for processing data stored in either of said main memory or said cache memory;

a main memory controller electrically connected to said CPU and accessible by said CPU for providing data to said CPU that is stored in said main memory;

a cache controller electrically connected to said CPU and accessible by said CPU for providing data to said CPU that is stored in said cache memory;

means for concurrently retrieving requested data from both said cache memory and said main memory by simultaneously activating both said cache memory controller and said main memory controller; and means for terminating access of said main memory controller upon an occurrence of a successful retrieval of said requested data from said cache memory.

9. A system as recited in claim 8, wherein said means for terminating access of said memory controller includes a deasserted miss line interconnecting said cache controller and said memory controller.

10. A computer system having a main memory, a main memory controller, a cache memory and a cache memory controller, said system comprising:

means, electrically connected to both said main memory controller and said cache memory controller, for generating a physical address;

means, electrically connected to said generating means, for concurrently applying said physical address to said main memory controller and to said cache memory controller, to thereby retrieve data from said cache memory and said main memory through simultaneous activation of both said cache memory controller and said main memory controller; and means, electrically connected to said cache memory controller and said main memory controller, for terminating the application of said physical address to said main memory controller upon an occurrence of a successful retrieval of said data from said cache memory.

11. A system as recited in claim 10, wherein said means for applying said physical address to said main memory controller comprises means for asserting a Control Address Strobe control pulse.

12. A system as recited in claim 11, wherein said means for terminating the application of said physical address to said main memory controller comprises means for disabling said means for asserting a Control Address Strobe control pulse.

13. A system as recited in claim 12, further comprising means for detecting a "miss" in said cache memory associated with said cache memory controller.

14. A system as recited in claim 13, wherein a detection of a "miss" in said cache memory actuates said means for disabling said means for asserting a CAS control signal.

15. A method of accessing data in a computer system including a central processing unit (CPU) electrically connected to a cache memory via a cache memory controller, and electrically connected to a main memory via a main memory controller, wherein both said main memory and said cache memory can store the data, said method comprising the steps of:

accessing said cache memory, said cache memory accessing step performed by said CPU;

accessing said main memory, said main memory accessing step performed by said CPU, at the same time said cache memory is accessed, to thereby retrieve said data from both said cache memory and said main memory through simultaneous activation by said CPU of both said cache memory controller and said main memory controller coupled to said cache memory and said main memory, respectively; and terminating the access of said main memory, said terminating step performed by said cache controller upon an occurrence of a successful retrieval of said data from said cache memory.

16. A method of accessing data in a computer system including a central processing unit (CPU) electrically connected to a main memory via a main memory controller, and electrically connected to a cache memory via a cache memory controller, wherein both said main memory and said cache memory can store the data, said method comprising the steps of:

generating a physical address, said generating step performed by said CPU;

concurrently applying said physical address to said main memory controller and said cache memory controller, to thereby retrieve said data from both said cache memory and said main memory through simultaneous activation of both said cache memory controller and said main memory controller; and determining whether or not to terminate application of said physical address to said main memory controller, said determining step performed by said cache controller upon an occurrence of a successful retrieval of said data from said cache memory.

17. A method as recited in claim 16, further comprising the step of determining whether or not said data corresponding to said generated physical address is located in said cache memory associated with said cache memory controller.

18. A method as recited in claim 17, wherein a decision to terminate application of said physical address to said main memory follows a determination that desired data was not located in said cache memory.

19. A method as recited in claim 18, further comprising the optional step of asserting a Control Address Strobe control pulse.

20. A method as recited in claim 19, wherein said step of asserting a Control Address Strobe control pulse is performed if a decision is made to terminate application of said address to said main memory.

21. A method as recited in claim 20, wherein said step of asserting a Control Address Strobe control pulse is performed if and only if a decision is made to not terminate application of said address to said main memory.

22. A computer system having a central processing unit (CPU) electrically connected to a first memory and to a second memory, said computer system comprising:
  a first controller, electrically connected between said CPU and said first memory, for accessing data stored in said first memory;
  a second controller, electrically connected between said CPU and said second memory, for accessing data stored in said second memory;
  address circuitry, electrically connected to both said first controller and to said second controller, for simultaneously providing address signals to both said first controller and to said second controller; and
  control circuitry, electrically connected to both said first controller and to said second controller, for concurrently retrieving data from both said first memory and said second memory by simultaneously activating both said first controller and said second controller, said first controller disabling said second controller upon an occurrence of a successful retrieval of said data from said first memory.

23. The computer system of claim 22 wherein said first controller is a cache controller.

24. The computer system of claim 22 wherein said second controller is a memory controller.

25. The computer system of claim 22 wherein said address circuitry comprises an address bus and a control bus.

26. The computer system of claim 22 wherein said selected data is data that is stored at the physical address relating to said address signals provided by said address circuitry.

* * * * *